US012234126B2

(12) United States Patent
Wang

(10) Patent No.: US 12,234,126 B2
(45) Date of Patent: Feb. 25, 2025

(54) CONNECTION DEVICE AND CONNECTION METHOD FOR DETECTION OF A TENSION MEMBER FOR AN ELEVATOR

(71) Applicant: Otis Elevator Company, Farmington, CT (US)

(72) Inventor: Wei Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/511,524

(22) Filed: Nov. 16, 2023

(65) Prior Publication Data

US 2024/0375913 A1 Nov. 14, 2024

(30) Foreign Application Priority Data

May 9, 2023 (CN) ........................ 202310518672.0

(51) Int. Cl.
*B66B 7/06* (2006.01)

(52) U.S. Cl.
CPC .............. *B66B 7/064* (2013.01); *B66B 7/062* (2013.01)

(58) Field of Classification Search
CPC ......... B66B 7/062; B66B 7/064; B66B 7/085; B66B 7/1223
See application file for complete search history.

(56) References Cited

U.S. PATENT DOCUMENTS 7,506,728 B2 * 3/2009 Hawkes ................ B66B 7/1223 187/277
8,640,282 B2 2/2014 Maguire et al.
11,174,126 B2 * 11/2021 Dold .................... H01R 4/2406
2016/0152445 A1 * 6/2016 Lehtinen .............. H01R 13/639 439/367
2016/0221796 A1 8/2016 Puranen et al.

FOREIGN PATENT DOCUMENTS

AU 2019419075 B2 6/2022
CN 115744517 A * 3/2023 ............. B66B 7/062
WO WO-2011003791 A1 * 1/2011 ............. B66B 7/062
WO WO-2014064022 A1 * 5/2014 ............. B66B 7/062

OTHER PUBLICATIONS

Machine Translation of WO 2011/003791.*
European Search Report for Application No. 24173573.7; Issued Sep. 11, 2024, 8 Pages.

* cited by examiner

*Primary Examiner* — Diem M Tran
(74) *Attorney, Agent, or Firm* — CANTOR COLBURN LLP

(57) ABSTRACT

A connection device and a connection method for detection of a tension member for an elevator. The connection device includes a plurality of electrical connection terminals and is configured to be detachably connected to an end portion of a tension member for an elevator. The tension member is configured for suspending an elevator car and/or a counter-weight and has a covering layer and a load-bearing portion including a plurality of separate load-bearing core wires and covered by the covering layer. The respective one ends of the plurality of electrical connection terminals are electrically connected correspondingly to the load-bearing core wires located at the end portion and exposed outwardly and respective other ends are used for outward electrical connection, after the connection device is connected to the end portion.

14 Claims, 3 Drawing Sheets

CONNECTION DEVICE AND CONNECTION METHOD FOR DETECTION OF A TENSION MEMBER FOR AN ELEVATOR

FOREIGN PRIORITY

This application claims priority to Chinese Patent Application No. 202310518672.0, filed May 9, 2023, and all the benefits accruing therefrom under 35 U.S.C. § 119, the contents of which in its entirety are herein incorporated by reference.

TECHNICAL FIELD

The present disclosure relates to the technical field of elevators, in particular to a connection device and a connection method for detection of a tension member for an elevator.

BACKGROUND

Elevator equipment has been widely used in social life. A typical elevator system can usually be equipped with an elevator car, a counterweight, a main engine, a cable, and a traction pulley, wherein the cable is used to connect and carry the elevator car and counterweight. Under the action of the power provided by the main engine transmitted through the traction pulley, the cable will drive the elevator car to move up or down along the elevator hoistway, thus transporting passengers or goods carried in the elevator car to the target floors of the building.

Traditional types of cables, such as round steel cables, are widely used in elevator systems. However, new types of tension members for an elevator have been developed and applied to replace traditional elevator cables. For example, in FIG. 1, an application scenario is schematically shown, where a tension member 10 with a flat configuration for an elevator is used to suspend and connect the elevator car and the counterweight. Such a tension member for an elevator can include several independent load-bearing core wires, and a covering layer is provided to cover them. Through the covering layer, an engagement surface that engages with the traction pulley can be defined, and power can be transmitted from the traction pulley to the load-bearing core wires via the covering layer, which then acts on the elevator car and the counterweight to drive them to move up or down.

Such tension members for an elevator have different structure and working characteristics from traditional elevator cables, and often needs to be tested during installation, use, and maintenance so as to understand the current state of the load-bearing core wires inside the structure, such as determining whether one or part of the load-bearing core wires are already worn, broken, missing, in poor contact, or not connected. Although some technical means has been provided in the prior art, in practice it is still mostly time-consuming and costly to operate, and sometimes it even requires multiple rework operations or results in inaccurate detection results.

SUMMARY

In view of the foregoing, the present disclosure provides a connection device and a connection method for detection of a tension member for an elevator, so as to solve or at least alleviate one or more of the aforementioned problems and other problems in the prior art, or to provide an alternative technical solution to the prior art.

First, according to one aspect of the present disclosure, a connection device for detection of a tension member for an elevator is provided. The tension member is configured for suspending an elevator car and/or a counterweight, and has a load-bearing portion and a covering layer, the load-bearing portion comprising a plurality of separate load-bearing core wires and being covered by the covering layer, wherein the connection device has a plurality of electrical connection terminals and is configured to be detachably connected to an end portion of the tension member, and respective one ends of the plurality of electrical connection terminals are electrically connected correspondingly to the load-bearing core wires located at the end portion and exposed outwardly and respective other ends of the plurality of electrical connection terminals are used for outward electrical connection, after the connection device is connected to the end portion.

In the connection device for detection of a tension member for an elevator according to the present disclosure, optionally, the connection device comprises: first component having an accommodation portion for accommodating the end portion, wherein the plurality of electrical connection terminals are arranged on the first component; and a second component detachably connected to the first component and fixing the end portion in place in the accommodation portion.

In the connection device for detection of a tension member for an elevator according to the present disclosure, optionally, the plurality of electrical connection terminals are arranged in parallel, each of which has a first end and a second end, and the first end and the second end are configured to extend toward the load-bearing core wires located at the end portion and the outside of the first component, respectively, after the connection device is connected to the end portion.

In the connection device for detection of a tension member for an elevator according to the present disclosure, optionally, the first end is configured to abut against the load-bearing core wire and exert a force thereon after the connection device is connected to the end portion, and/or the second end is configured to be substantially parallel to a plane where the load-bearing core wires at the end portion locate, after the connection device is connected to the end portion.

In the connection device for detection of a tension member for an elevator according to the present disclosure, optionally, the first end is inclined at an angle with respect to the plane where the load-bearing core wires at the end portion locate so that the first end abuts against the load-bearing core wire and exerts a force thereon.

In the connection device for detection of a tension member for an elevator according to the present disclosure, optionally, an additional conductive layer having a conductive material is provided in an electrical connection area between the first end and the load-bearing core wire, the conductive material including a conductive adhesive or conductive paste.

In the connection device for detection of a tension member for an elevator according to the present disclosure, optionally, each electrical connection terminal has an intermediate portion that is located between the first end and the second end and is arranged inside the first component.

In the connection device for detection of a tension member for an elevator according to the present disclosure, optionally, the load-bearing portion and the covering layer form a thickness of the tension member and a width greater than the thickness, a height of the accommodation portion is not greater than the thickness of the tension member, and a width of the accommodation portion is not less than the width of the tension member.

In the connection device for detection of a tension member for an elevator according to the present disclosure, optionally, the first component is configured to have a first portion that is relatively high and a second portion that is relatively low in height, the accommodation portion and the plurality of electrical connection terminals are arranged on the first portion and the second portion, respectively, and the second component is connected to the first portion by at least one connection member and fixes the end portion in place in the accommodation portion.

In addition, according to another aspect of the present disclosure, a connection method for detection of a tension member for an elevator is further provided, wherein the tension member is configured for suspending an elevator car and/or a counterweight and has a load-bearing portion and a covering layer, the load-bearing portion comprises a plurality of separate load-bearing core wires and is covered by the covering layer, and the detection connection method comprises the steps of: providing a tension member for an elevator having the load-bearing core wires exposed outwardly at an end portion; and connecting a device having a plurality of electrical connection terminals detachably to the end portion, electrically connecting respective one ends of the plurality of electrical connection terminals correspondingly to load-bearing core wires located at the end portion, and electrically connecting respective other ends of the plurality of electrical connection terminals outwardly.

In the connection method for detection of a tension member for an elevator according to the present disclosure, optionally, the connection method further comprises the step of: performing a cutting operation on the tension member to make the load-bearing core wires to expose outwardly at the end portion.

In the connection method for detection of a tension member for an elevator according to the present disclosure, optionally, the connection method further comprises the step of: providing an additional conductive layer having a conductive material in an electrical connection area between the electrical connection terminals and the load-bearing core wires.

In the connection method for detection of a tension member for an elevator according to the present disclosure, optionally, the conductive material includes a conductive adhesive or conductive paste.

In the connection method for detection of a tension member for an elevator according to the present disclosure, optionally, each electrical connection terminal has a first end and a second end, the plurality of electrical connection terminals are arranged in parallel, and the first end and the second end are configured to extend toward the load-bearing core wires located at the end portion and toward the outside, respectively, after the device is connected to the end portion.

In the connection method for detection of a tension member for an elevator according to the present disclosure, optionally, the first end is configured to abut against the load-bearing core wire and exert a force thereon after the device is connected to the end portion, and/or the second end is configured to be substantially parallel to a plane where the load-bearing core wires at the end portion locate, after the device is connected to the end portion.

In the connection method for detection of a tension member for an elevator according to the present disclosure, optionally, the first end is inclined at an angle with respect to the plane where the load-bearing core wires at the end portion locate so that the first end abuts against the load-bearing core wire and exerts a force thereon.

In the connection method for detection of a tension member for an elevator according to the present disclosure, optionally, the device comprises a first component and a second component and the plurality of electrical connection terminals are arranged on the first component, and after the end portion is accommodated in the accommodation portion located on the first component, the end portion is fixed in place in the accommodation portion by detachably connecting the second component to the first component.

In the connection method for detection of a tension member for an elevator according to the present disclosure, optionally, the first component is configured to have a first portion that is relatively high and a second portion that is relatively low in height, the accommodation portion and the plurality of electrical connection terminals are arranged on the first portion and the second portion, respectively, and the second component is connected to the first portion by at least one connection member and the end portion is fixed in place in the accommodation portion.

With the solutions of the present disclosure, it is very convenient and efficient to connect a tension member for an elevator, and quickly detect the current state of the load-bearing core wires therein, which not only saves time and labor, but also has high operation efficiency and reduces the cost effectively. Accordingly, the installation, use, maintenance operations of a tension member for an elevator can be facilitated, and the operation safety of an elevator system can be strongly guaranteed.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structures and configurations described herein, and are not required to be drawn to scale.

DETAILED DESCRIPTION

Firstly, it should be noted that the structure, composition, steps, characteristics, advantages, etc. of a connection device and a connection method for detection of a tension member for an elevator according to the present disclosure will be described below by way of examples. However, neither of the descriptions should be understood as limiting the present disclosure in any way. In the text, the technical terms "first", "second" are only used for the purpose of distinguishing and are not intended to indicate the order and relative importance thereof. The technical term "connection" includes connections in a direct or indirect manner. The technical term "substantially" is intended to include immaterial errors associated with a measurement of a specific amount, for example, including ranges such as +8%, +5%, or +2% of a given value.

In addition, for any single technical feature described or implied in the embodiments mentioned herein, or any single technical feature shown or implied in individual drawings, the present disclosure still allows for any combination or deletion of these technical features (or equivalents thereof) without any technical obstacle. Therefore, it should be considered that these more embodiments according to the present disclosure are also within the scope of the present disclosure.

Figure 1:
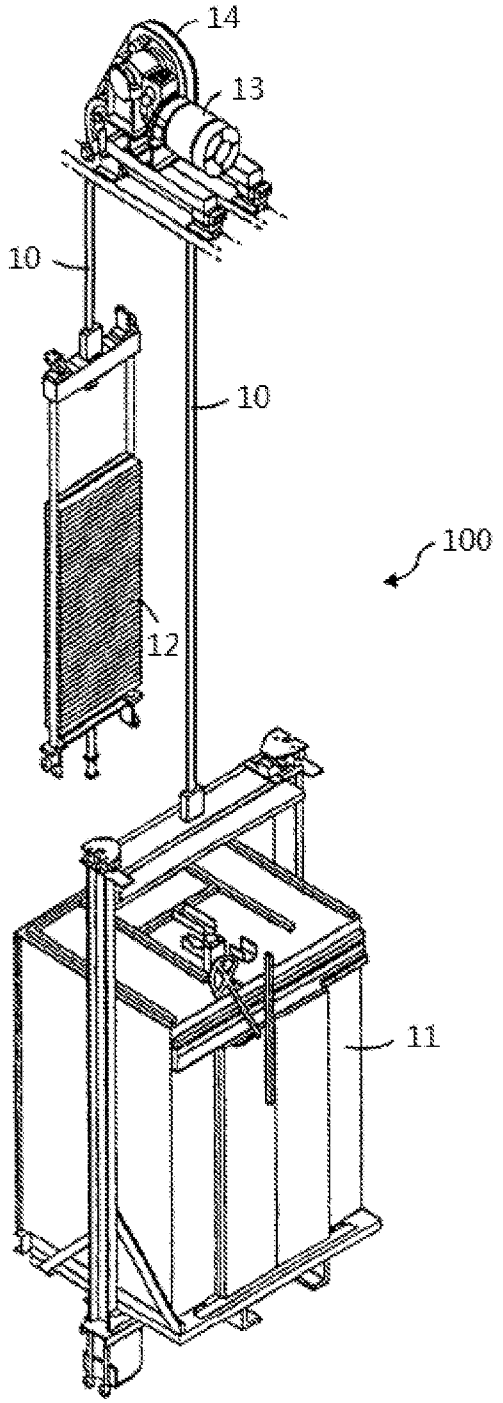
FIG. 1 is a local three-dimensional structural schematic diagram of an example of an elevator system using a tension member for an elevator.

In FIG. 1, a local perspective configuration of an elevator system 100 is schematically illustrated in an exemplary manner, in which some components such as an elevator car 11, a counterweight 12, a main engine 13, a traction pulley 14 and a tension member for an elevator 10 are configured. In the elevator system 100, the tension member 10 is used to suspend and connect the elevator car 11 and the counterweight 12. The tension member 10 meshes with the traction pulley 14. When the power output from the main machine 13 drives the traction pulley 14 to rotate, the power will be transmitted to the tension member 10 to move it, thereby driving the elevator car 11 and the counterweight 12 connected to the tension member 10 to move up or down along the elevator hoistway direction. In some application scenarios, these elevator tension members may be referred to as elevator belts, steel belts, lifting belts, drive belts, and the like. The tension member 10 may be configured to include two parts, namely a load-bearing portion and a covering layer. For example, as exemplarily shown in FIG. 4, the load-bearing portion may have two, three or more mutually independent load-bearing core wires 101 for bearing together an external force applied to the tension member, where such force, in the elevator system, is usually the gravity brought about by the elevator car, the objects carried, the counterweight, and the like. Therefore, the load-bearing portion and its load-bearing core wires are generally subjected to a tensile force. In general, the load-bearing core wire 101 may be formed of a plurality of strands made of a metal material (such as steel, alloy steel, etc.) according to the specific application needs, and the number, diameter, tensile strength, processing technology, arrangement manner, etc. of the strands allow on-demand configuration.

A covering layer 102 is provided on the outer side of the tension member 10 for covering the load-bearing core wires 101 therein. Through the arrangement of the covering layer 102, a meshing surface between the tension member and the traction pulley or other mating parts can be defined, and power can be transmitted from the traction pulley and other parts to the load-bearing core wires 101 of the load-bearing portion via the covering layer 102, so that the elevator car and the counterweight can be driven to move by the tension member 10. In general, the covering layer 102 may optionally be made of an elastomer material. For example, any suitable material such as a polyurethane material (e.g., thermoplastic polyurethane, such as thermoplastic urethane) may be selected according to actual needs, and a suitable processing technology may be selected accordingly.

When in actual use, it is possible to install the tension member 10 only for one or more cars, or only for one or more counterweights, or for both the car(s) and counterweight(s) required, in the elevator system, depending on the application requirements. In addition, when the actual installation length required exceeds the length of a single tension member or a section of the tension member for an elevator breaks partially during use, the corresponding end portions of two or more separate tension members can be joined via intermediate connection members (also commonly referred to as terminal devices, terminal clamps, etc.), thereby forming a new tension member for an elevator conforming to the application requirements. It should be noted that such a coupled tension member for an elevator is also used herein as a tension member for an elevator. Regarding the above-mentioned intermediate connection members, reference can be made to the relevant disclosures already disclosed by the applicant of the present application, such as the Chinese Patent issued as CN1211272C and other documents.

In accordance with the design idea of the present disclosure, a connection device is provided for convenient operation and use during the installation, use and maintenance of a tension member for an elevator, which not only saves time and labor in operation, but also has high efficiency, is very suitable for on-site operation by a technician(s), and helps to reduce costs. As an example, a specific embodiment of a connection device is given in FIGS. 2 and 3.

Figure 2:
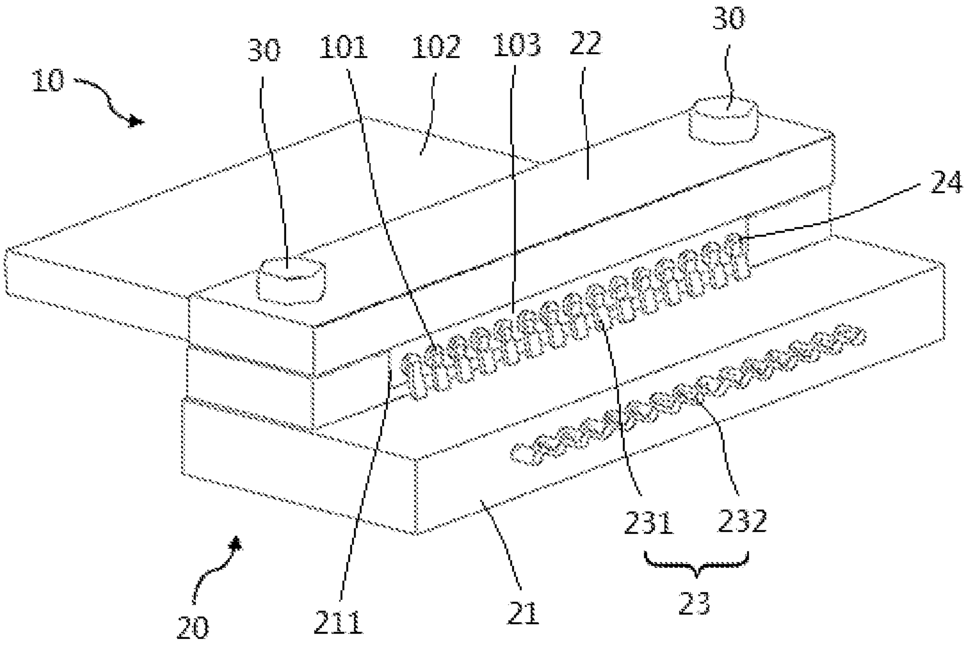
FIG. 2 is a three-dimensional structural schematic diagram after installation and connection of an embodiment of a connection device according to the present disclosure with an example of a tension member for an elevator.

In this embodiment, the connection device 20 is configured to include two detachably mounted parts, namely a first component 21 and a second component 22, which can be assembled and connected together with the tension member to be detected using one or more connection members 30 (e.g., screws, bolts). As shown in FIG. 2, an accommodation portion 211 may be provided on the first component 21, and electrical connection terminals 23 may be provided on the first component 21. The space provided by the accommodation portion 211 can be used to place the end portion 103 of the tension member 10 to be detected. When the second component 22 is fixed to the first component 21 using the connection members 30, the end portion of the tension member 10 can be fixed in place in the accommodation portion 211 by the second component 22. And then, the respective ends of the aforementioned electrical connection terminals 23 (shown as the first ends 231 in FIG. 2) form corresponding electrical connections with these outwardly exposed load-bearing core wires 101 located at the end portion 103 of the tension member 10. Thus, by testing the conductivity characteristics of the respective other ends of these electrical connection terminals 23 (shown as the second ends 232 in FIG. 2) and the corresponding other ends of these load-bearing core wires 101 one by one, such as whether they can be electrically connected normally, the measured electrical signals (e.g., resistance, current, voltage, or electromagnetic flux), etc., the on/off status and performance of the respective load-bearing core wires 101 at the moment can be determined, such as wear and tear, degradation of tensile strength, or even fracture damage. The above operation and characteristic analysis can be carried out with the help of any applicable professional inspection equipment, such as resistance-based inspection equipment, which will not be further discussed herein.

It should be noted that for the tension member 10 to be detected, the load-bearing core wires 101 therein will be exposed outwardly at the end portion 103 for an electrical connection operation. A cutting operation can be performed on the tension member when necessary, for example, a vertical, flat cutting is carried out at or near the end portion of the tension member using a cutting machine or the like, so that the load-bearing core wires are exposed outwardly at the end portion of the tension member, so as to be electrically connected with one ends of the electrical connection terminals 23 of the connection device 20 in a convenient manner. In contrast, the existing technologies usually use a component having a sharp end (such as a pin, etc.) to directly pierce the covering layer of the tension member and reach the internal load-bearing core wire to form an electrical connection for detection. Such a traditional method relatively costs more time and labor, especially for the load-bearing core wires which are usually invisible inside the tension member, as they are covered by the covering layer. Sometimes, multiple rework operations may be required if they are operated in an essentially blind manner.

In addition, although the electrical connection terminals 23 in the connection device 20 cooperate with the load-bearing core wires 101 in the tension member 10 for electrical connection test, it is not required that a completely corresponding relationship should formed between them. For example, in some application scenarios, it may be allowed that the number of electrical connection terminals 23 configured in the connection device 20 is more than or less than the number of load-bearing core wires 101 configured in the tension member 10, where at this point, the detection purpose can also be achieved by one or more corresponding matching connection test operations, or the detection purpose can at least be partially achieved. It should be understood that the connection device according to the present disclosure is applicable to many complicated elevator tension member test scenarios.

Figure 3:
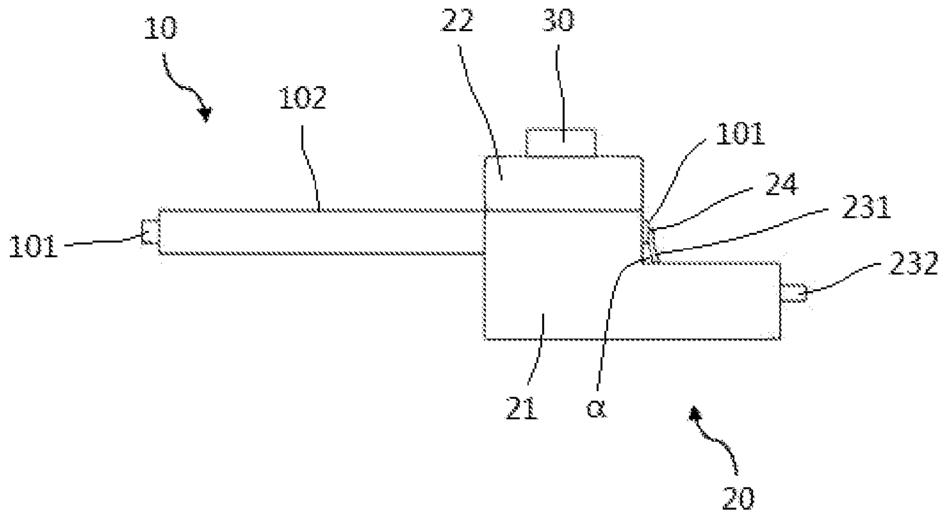
FIG. 3 is a side-view structural schematic diagram of the embodiment of the connection device after installation and connection with the example of the tension member for an elevator shown in FIG. 2.

With continued reference to FIGS. 2 and 3, the electrical connection terminals 23 may be made of a conductive material such as copper, and may be configured as desired to any possible shape configuration. Optionally, the electrical connection terminals 23 may be arranged in parallel in the connection device 20 to form a configuration similar to pins. And, their respective first ends 231 and second ends 232 are made to extend toward the load-bearing core wires 101 and the outside of the first component 21, respectively, after the connection device 20 is installed and connected to the end portion 103 of the tension member 10. Accordingly, the electrical connection and other operations can be facilitated.

For example, a part or all of the first ends 231 of the electrical connection terminals 23 may be optionally configured such that, after the connection device 20 is installed and connected to the end portion of the tension member 10, the first ends 231 can abut against the load-bearing core wires 101 and exert a force thereon. This arrangement is advantageous because it will help eliminate the air gap that may exist between the electrical connection terminals 23 and the load-bearing core wires 101, thereby facilitating and maintaining a more reliable and durable electrical connection between them. As an example, FIG. 3 shows that the first ends 231 of the electrical connection terminals 23 can be arranged to form an inclined angle $\alpha$ with respect to the plane where the load-bearing core wires 101 at the end portion 103 locate, so as to force the first ends 231 to abut against the load-bearing core wires 101 and exert a force thereon. The specific values of the inclined angle $\alpha$ can be selectively configured and adjusted according to different application scenarios, and the present disclosure does not make any restrictions in this regard.

In one or more embodiments, an additional conductive layer 24 may be considered to be provided at the electrical connection area between a part or all of the first ends 231 and the load-bearing core wires 101 as needed, so as to enhance the conductivity, contact firmness, etc. at the contact positions. The additional conductive layer 24 may be made of conductive materials with conductive characteristics like conductive adhesive, conductive paste, etc., such as conductive silver adhesive, conductive copper adhesive, conductive silver paste, and the like, which may be coated on the electrical connection area described above in a very convenient manner. The specific coverage area, thickness, etc. of the additional conductive layer 24 may be flexibly configured as required, for example, the additional conductive layer 24 may even be provided only for a part of the first ends 231 and the load-bearing core wires 101. The test may be started after natural drying of the additional conductive layer. However, during the waiting period, suitable apparatuses such as heaters, blowers, etc. may be used to speed up the drying process, thereby improving efficiency.

In the embodiment shown in FIG. 2, the electrical connection terminals 23 are configured to have intermediate portions between the first ends 231 and the second ends 232, and the intermediate portions of the electrical connection terminals 23 are arranged inside the first component 21. The electrical connection terminals 23 may be manufactured at the time, for example, when molding the first component 21. Of course, in one or some embodiments, the electrical connection terminals 23 may be integrally arranged at suitable positions on the first component 21 directly, such as on the outer surface of the first component 21, by means of, for example, bonding, welding, or the like.

In the connection device 20, the first component 21 is shown by way of example as having a configuration of a substantially stepped shape. More specifically, the first component 21 is configured to have a first portion and a second portion, wherein the former is higher than the latter in height. At this point, it is appropriate to arrange the accommodation portion 211 and the electrical connection terminals 23 in the first portion and the second portion, respectively, because this would facilitate the connection or disconnection operations, test operations, and the like with respect to the tension member 10 and the electrical connection terminals 23. For example, when the second ends 232 of the electrical connection terminals 23 are arranged on the first component 21, for example, on one side of the first component 21 relatively remote from the end portion of the tension member, and the second ends 232 are made substantially parallel to the plane of the load-bearing core wires 101 located at the end portion 103, it will be easier to perform a connection test operation for the second ends 232.

Figure 4:
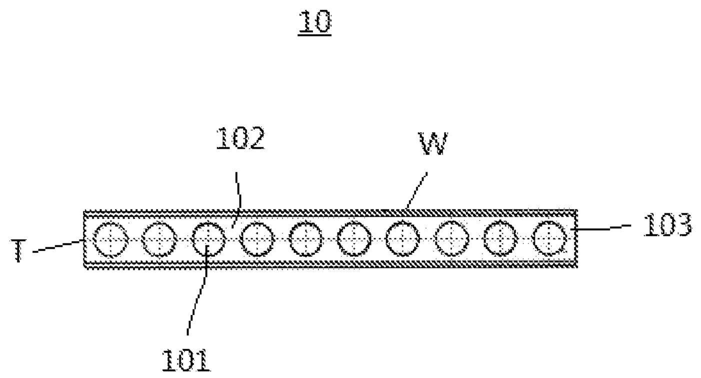
FIG. 4 is a three-dimensional structural schematic diagram of the example of the tension member for an elevator shown in FIG. 2.

It should be noted that the tension member 10 is shown in FIGS. 2 to 4 to have a generally flat shape, where its thickness T and its width W greater than the thickness are schematically shown. Considering the aforementioned configuration of the tension member, the accommodation portion 211 on the first component 21 can be optionally configured such that its height is not greater than the thickness T of the tension member and its width is not less than the width W of the tension member. As such, when the second component 22, the first component 21 and the tension member 10 are connected together in a detachable manner, due to the elastic property of the covering layer 12 generally made of an elastic material on the outer side of the tension member 10, a more stable and reliable installation and connection between the tension member and the connection device can thus be achieved, which is very beneficial to the test operation, since it can avoid the impact of unexpected interference, thus ensuring the accuracy of the test data and the efficiency of the operation.

It should also be noted that the present disclosure also allows the tension member 10 to employ other feasible configurations. For example, it may have an arc shape, a corrugated shape or some irregular shape. In addition, the present disclosure also allows the connection device 20 to make corresponding changes in the structure and installation arrangement of the component composition, the accommodation portion and the electrical connection terminals. For example, it may be composed of three or more parts, where detachable operations may be realized among these parts by using, for example, buckles, concave and convex structures, and the like.

Figure 5:
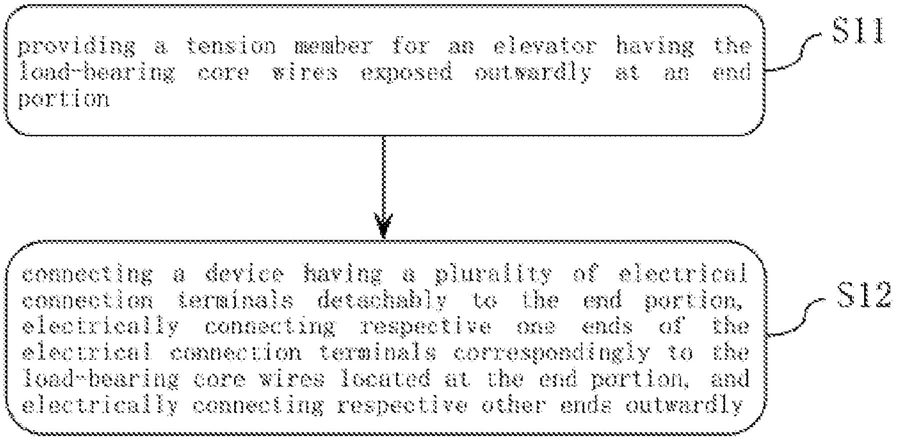
FIG. 5 is a schematic diagram of a processing flow of an embodiment of a connection method for detection of a tension member for an elevator according to the present disclosure.

Referring then to FIG. 5, a processing flow of an embodiment of a connection method for detection of a tension member for an elevator according to the present disclosure is shown. In this embodiment, the following steps may be included:

In step S11, a tension member for an elevator to be tested is provided, wherein the tension member is configured for suspending an elevator car and/or a counterweight in an elevator system and has the load-bearing core wires exposed outwardly at an end portion of the tension member. As previously described, the tension member to be detected may be a separate elevator tension member or may be a tension member for an elevator formed by joining a plurality of separate elevator tension members together using a terminal device.

In step S12, a detection connection device having a plurality of electrical connection terminals may be detachably connected to the end portion of the tension member to be tested, and these electrical connection terminals can be made to be electrically connected to the load-bearing core wires in the tension member correspondingly, so that a detection and other operations can be subsequently carried out for the tension member. Of course, after the test is completed, the connection between the tension member to be tested and the connection device can be removed by performing a reverse operation.

Those skilled in the art can understand that the technical contents relating to the connection device and the composition thereof, the connection and test operation of the tension member, the load-bearing core wire, the covering layer, the electrical connection terminal and the additional conductive layer have been described in great detail in the foregoing. For example, an additional conductive layer may be provided in the electrical connection area between a part or all of the electrical connection terminals and the load-bearing core wires in the tension member to be tested, the electrical connection terminals may be arranged so that one ends thereof abut against the corresponding load-bearing core wires and exert a force thereon, and the like. Therefore, it may directly refer to the specific description and contents of the corresponding parts above to thereby form further possible steps and configurations according to the method of the present disclosure, which will not be repeated here.

The connection device and the connection method for detection of a tension member for an elevator according to the present disclosure have been described above in detail by way of examples only. These examples are merely used to illustrate the principles and embodiments of the present disclosure, rather than limiting the present disclosure. Various modifications and improvements can be made by those skilled in the art without departing from the scope of the present disclosure. Therefore, all equivalent technical solutions should fall within the scope of the present disclosure and be defined by the claims of the present disclosure.

What is claimed is:

1. A connection device for detection of a tension member for an elevator, the tension member configured for suspending an elevator car and/or a counterweight and having a load-bearing portion and a covering layer, the load-bearing portion comprising a plurality of separate load-bearing core wires and being covered by the covering layer, wherein the connection device has a plurality of electrical connection terminals and is configured to be detachably connected to an end portion of the tension member, and respective one ends of the plurality of electrical connection terminals are electrically connected correspondingly to the load-bearing core wires located at the end portion and exposed outwardly and respective other ends of the plurality of electrical connection terminals are used for outward electrical connection, after the connection device is connected to the end portion;

wherein the connection device comprises:

a first component having an accommodation portion for accommodating the end portion, wherein the plurality of electrical connection terminals are arranged on the first component; and a second component detachably connected to the first component and fixing the end portion in place in the accommodation portion;

wherein the plurality of electrical connection terminals are arranged in parallel, each of which has a first end and a second end, and the first end and the second end are configured to extend toward the load-bearing core wires located at the end portion and the outside of the first component, respectively, after the connection device is connected to the end portion;

wherein the first end is configured to abut against the load-bearing core wire and exert a force thereon after the connection device is connected to the end portion, and the second end is configured to be substantially parallel to a plane where the load-bearing core wires at the end portion locate, after the connection device is connected to the end portion;

wherein the first end is inclined at an angle with respect to the plane where the load-bearing core wires at the end portion locate so that the first end abuts against the load-bearing core wire and exerts a force thereon.

2. The connection device for detection of a tension member for an elevator according to claim 1, wherein each electrical connection terminal has an intermediate portion that is located between the first end and the second end and is arranged inside the first component.

3. The connection device for detection of a tension member for an elevator according to claim 1, wherein the load-bearing portion and the covering layer form a thickness of the tension member and a width greater than the thickness, a height of the accommodation portion is not greater than the thickness of the tension member, and a width of the accommodation portion is not less than the width of the tension member.

4. The connection device for detection of a tension member for an elevator according to claim 1, wherein the first component is configured to have a first portion that is relatively high and a second portion that is relatively low in height, the accommodation portion and the plurality of electrical connection terminals are arranged on the first portion and the second portion, respectively, and the second component is connected to the first portion by at least one connection member and fixes the end portion in place in the accommodation portion.

5. A connection device for detection of a tension member for an elevator, the tension member configured for suspending an elevator car and/or a counterweight and having a load-bearing portion and a covering layer, the load-bearing portion comprising a plurality of separate load-bearing core wires and being covered by the covering layer, wherein the connection device has a plurality of electrical connection terminals and is configured to be detachably connected to an end portion of the tension member, and respective one ends of the plurality of electrical connection terminals are electrically connected correspondingly to the load-bearing core wires located at the end portion and exposed outwardly and respective other ends of the plurality of electrical connection terminals are used for outward electrical connection, after the connection device is connected to the end portion;

wherein the connection device comprises:

a first component having an accommodation portion for accommodating the end portion, wherein the plurality of electrical connection terminals are arranged on the first component; and a second component detachably connected to the first component and fixing the end portion in place in the accommodation portion;

wherein the plurality of electrical connection terminals are arranged in parallel, each of which has a first end and a second end, and the first end and the second end are configured to extend toward the load-bearing core wires located at the end portion and the outside of the first component, respectively, after the connection device is connected to the end portion;

wherein an additional conductive layer having a conductive material is provided in an electrical connection area between the first end and the load-bearing core wire, the conductive material including a conductive adhesive or conductive paste.

6. The connection device for detection of a tension member for an elevator according to claim 5, wherein the first end is configured to abut against the load-bearing core wire and exert a force thereon after the connection device is connected to the end portion, and/or the second end is configured to be substantially parallel to a plane where the load-bearing core wires at the end portion locate, after the connection device is connected to the end portion.

7. The connection device for detection of a tension member for an elevator according to claim 6, wherein the first end is inclined at an angle with respect to the plane where the load-bearing core wires at the end portion locate so that the first end abuts against the load-bearing core wire and exerts a force thereon.

8. A connection method for detection of a tension member for an elevator, the tension member configured for suspending an elevator car and/or a counterweight and having a load-bearing portion and a covering layer, the load-bearing portion comprising a plurality of separate load-bearing core wires and being covered by the covering layer, wherein the connection method comprises:

providing a tension member for an elevator having the load-bearing core wires exposed outwardly at an end portion;

connecting a device having a plurality of electrical connection terminals detachably to the end portion, electrically connecting respective one ends of the plurality of electrical connection terminals correspondingly to load-bearing core wires located at the end portion, and electrically connecting respective other ends of the plurality of electrical connection terminals outwardly;

performing a cutting operation on the tension member to make the load-bearing core wires to expose outwardly at the end portion; and providing an additional conductive layer having a conductive material in an electrical connection area between the electrical connection terminals and the load-bearing core wires.

9. The connection method for detection of a tension member for an elevator according to claim 8, wherein the conductive material includes a conductive adhesive or conductive paste.

10. The connection method for detection of a tension member for an elevator according to claim 8, wherein each electrical connection terminal has a first end and a second end, the plurality of electrical connection terminals are arranged in parallel, and the first end and the second end are configured to extend toward the load-bearing core wires located at the end portion and toward the outside, respectively, after the device is connected to the end portion.

11. The connection method for detection of a tension member for an elevator according to claim 10, wherein the first end is configured to abut against the load-bearing core wire and exert a force thereon after the device is connected to the end portion, and/or the second end is configured to be substantially parallel to a plane where the load-bearing core wires at the end portion locate, after the device is connected to the end portion.

12. The connection method for detection of a tension member for an elevator according to claim 8, wherein the device comprises a first component and a second component and the plurality of electrical connection terminals are arranged on the first component, and after the end portion is accommodated in the accommodation portion located on the first component, the end portion is fixed in place in the accommodation portion by detachably connecting the second component to the first component.

13. The connection method for detection of a tension member for an elevator according to claim 12, wherein the first component is configured to have a first portion that is relatively high and a second portion that is relatively low in height, the accommodation portion and the plurality of electrical connection terminals are arranged on the first portion and the second portion, respectively, and the second component is connected to the first portion by at least one connection member and the end portion is fixed in place in the accommodation portion.

14. A connection method for detection of a tension member for an elevator, the tension member configured for suspending an elevator car and/or a counterweight and having a load-bearing portion and a covering layer, the load-bearing portion comprising a plurality of separate load-bearing core wires and being covered by the covering layer, wherein the connection method comprises:

providing a tension member for an elevator having the load-bearing core wires exposed outwardly at an end portion;

connecting a device having a plurality of electrical connection terminals detachably to the end portion, electrically connecting respective one ends of the plurality of electrical connection terminals correspondingly to load-bearing core wires located at the end portion, and electrically connecting respective other ends of the plurality of electrical connection terminals outwardly;

wherein each electrical connection terminal has a first end and a second end, the plurality of electrical connection terminals are arranged in parallel, and the first end and the second end are configured to extend toward the load-bearing core wires located at the end portion and toward the outside, respectively, after the device is connected to the end portion;

wherein the first end is configured to abut against the load bearing core wire and exert a force thereon after the connection device is connected to the end portion, and the second end is configured to be substantially parallel to a plane where the load bearing core wires at the end portion locate, after the connection device is connected to the end portion, wherein the first end is inclined at an angle with respect to the plane where the load-bearing core wires at the end portion locate so that the first end abuts against the load-bearing core wire and exerts a force thereon.

* * * * *